United States Patent
Horst et al.

(10) Patent No.: US 7,819,677 B2
(45) Date of Patent: Oct. 26, 2010

(54) MOUNTING FIXTURE FOR DETACHABLY FASTENING A COVER PLATE IN AN AIRCRAFT

(75) Inventors: Markus Horst, Bad Oldesloe (DE); Frank Rose, Hamburg (DE); Stephan Röpke, Buxtehude (DE)

(73) Assignee: Airbus Deutschland, Hamburg, DE (US)

( * ) Notice: Subject to any disclaimer, the term of this patent is extended or adjusted under 35 U.S.C. 154(b) by 339 days.

(21) Appl. No.: 12/145,589

(22) Filed: Jun. 25, 2008

(65) Prior Publication Data

US 2009/0000088 A1    Jan. 1, 2009

Related U.S. Application Data

(60) Provisional application No. 60/946,988, filed on Jun. 29, 2007.

(51) Int. Cl.
*H01R 13/62* (2006.01)
(52) U.S. Cl. .................................. 439/157; 439/310
(58) Field of Classification Search .................. 439/157, 439/310
See application file for complete search history.

(56) References Cited

U.S. PATENT DOCUMENTS

| 5,777,480 | A  | * | 7/1998 | Hatagishi et al. | 439/310 |
| 5,919,055 | A  | * | 7/1999 | Hattori | 439/310 |
| 6,981,313 | B2 | * | 1/2006 | Olejniczak et al. | 439/310 |

* cited by examiner

*Primary Examiner*—Tho D Ta
(74) *Attorney, Agent, or Firm*—Perman & Green LLP

(57) ABSTRACT

A mounting fixture for detachably fastening cover plates in an aircraft. For fixing, a retaining bracket fixed on the cover plate is snap-fitted onto a retaining pin fixed on a substructure of the fuselage cell. A first holder is fixed on the retaining pin for receiving at least one connecting element, and a second holder is displaceably fitted in a forked holder on the retaining bracket. The forked holder has a roughly U-shaped form with two upright arms each connected at their lower ends by a base plate. Two connecting elements are preferably each fixed in the holders. The connecting elements are formed as electrical and/or optical sockets and plugs each with cabling attached. By swiveling a contacting lever the second holder can be moved linearly to and fro in relation to the first holder and can be introduced and pushed at least in part into the first holder whereby the final electrical and/or optical contact is produced by means of the sockets and the plugs.

10 Claims, 2 Drawing Sheets

MOUNTING FIXTURE FOR DETACHABLY FASTENING A COVER PLATE IN AN AIRCRAFT

BACKGROUND

1. Field

The disclosed embodiments relate to a holder for detachably fastening a cover plate in an aircraft, more particularly in an airplane, wherein a fastening pin is fixed cushioned against vibration in the area of a substructure, and in order to fasten the cover plate the fastening pin can be locked in engagement with a retaining bracket mounted on the cover plate.

2. Brief Description of Related Developments

The known mounting fixtures for cover plates in airplanes, more particularly in passenger airplanes, enable a detent-locking and where necessary releasable fastening on the substructure inside the fuselage cell. Up until now the requisite in particular electrical plug connections and cables which serve to supply electrical devices in the passenger area have had to be fitted prior to locking the cover plate on the roof substructure. For this purpose the cover plates—before they are locked with the substructure by means of the mounting fixtures—initially hang down on short retaining cables which allow the plug connections to be drawn together to produce the electrical connection between the cables. Furthermore in the event of a mechanical failure of the mounting fixture the retaining cables prevent the cover plates from falling uncontrolled into the passenger area. The electrical devices can be for example reading lights, signal lamps and indicator lights for emergency exits.

For the required final quality control of the cabling each cover plate has to be removed and the proper seat of the plug connections has to be checked, which with restricted accessibility as a result of the cover plates hanging down from relatively short retaining cables becomes very time consuming.

It would be advantageous to provide a mounting fixture for cover plates in airplanes in which after the cover plate has locked with the substructure an electrical and/or optical plug connection can be produced in a simple way.

SUMMARY

A first holder with at least one connecting element is mounted on the fastening pin and a second holder with at least a further connecting element is provided in the area of the retaining bracket wherein the second holder by swiveling a contacting lever is linearly displaceable relative to the first holder in order in a connecting position of the mounting fixture to introduce the at least one further connecting element at least partly into the at least one connecting element, it is possible after locking the cover plate with the substructure by swiveling the contacting lever roughly 90° in a simple manner after completely engaging the cover plate onto the substructure to produce in particular an electrical and/or optical contact between the adjoining cover plates. Where necessary a connection can also be produced between other types of supply lines, such as ventilation, climate control, compressed air or hydraulic lines by means of the connecting elements.

The two holders of the mounting fixture according to the invention serve in a modular embodiment to house with positive locking action at least in some areas at least two connecting elements which can be in particular a plug and a socket for producing an electrical and/or optical connection. In the preferred symmetrical embodiment two connecting elements are each fitted in each of the two holders. Alternatively the connecting elements can also be formed as integral constituent parts of the holders. In this case the connecting elements cannot be removed and exchanged individually from the holders whereby the useful area of the holder is reduced but at the same time the manufacturing process is simplified.

During displacement of the first holder in relation to the second holder the connecting elements are not drawn out from the holders as a result of the contact friction because the connecting elements inserted with positive engagement at least in some areas in recesses in the holders are additionally locked with the holders in the area of the recesses.

The connecting elements which are as a rule each designed as a plug and socket can each connect a number of independent wires of an electrical and/or optical cable detachably to one another for transferring any type of signals.

When the mounting fixture is located in the connecting position, that is an electrical and/or optical contact exists between the connecting elements, the contacting lever is totally concealed in a gap between the cover plates. In the so-called disconnected position in which there is no contact between the connecting elements of the mounting fixture, the contacting lever protrudes beyond the external surface of the connecting plate so that a simple and rapid visual control of the proper electrical and/or optical connection of the cabling between the cover plates is possible.

A further development of the mounting fixture proposes that in the retaining bracket there is a resiliently displaceable operating tab which can be releasably snap-locked with the fastening pin to fasten the cover plate on the substructure of the fuselage cell.

By pressing the cover plate onto the fastening pin which is fixed cushioned against vibration on the substructure the cover plate is snap-locked onto the substructure. Both the fastening pin and the retaining bracket connected to the cover plate are constituent parts of the mounting fixture according to the invention.

By means of a suitable tool, for example a screw driver blade or the like, the fastening tab can be drawn out again from the retaining bracket where necessary against the spring force, whereby the retaining bracket releases the fastening pin and the cover plate can be removed from the substructure.

A further advantageous design of the mounting bracket proposes that in the operating tab a small rectangular recess is provided which only allows the contacting lever to be swiveled when the cover plate is completely locked.

This prevents a user from providing an electrical and/or optical contact if the connecting elements housed in the holders are not aligned opposite one another and actuation of the contacting lever would lead to damage to the connecting elements or the plug and socket respectively.

Further advantageous developments of the mounting fixture are explained in the further patent claims.

BRIEF DESCRIPTION OF THE DRAWINGS

In the drawings.

In the drawings the same structural elements are each provided with the same reference numerals.

DETAILED DESCRIPTION OF THE DRAWINGS

Figure 1:
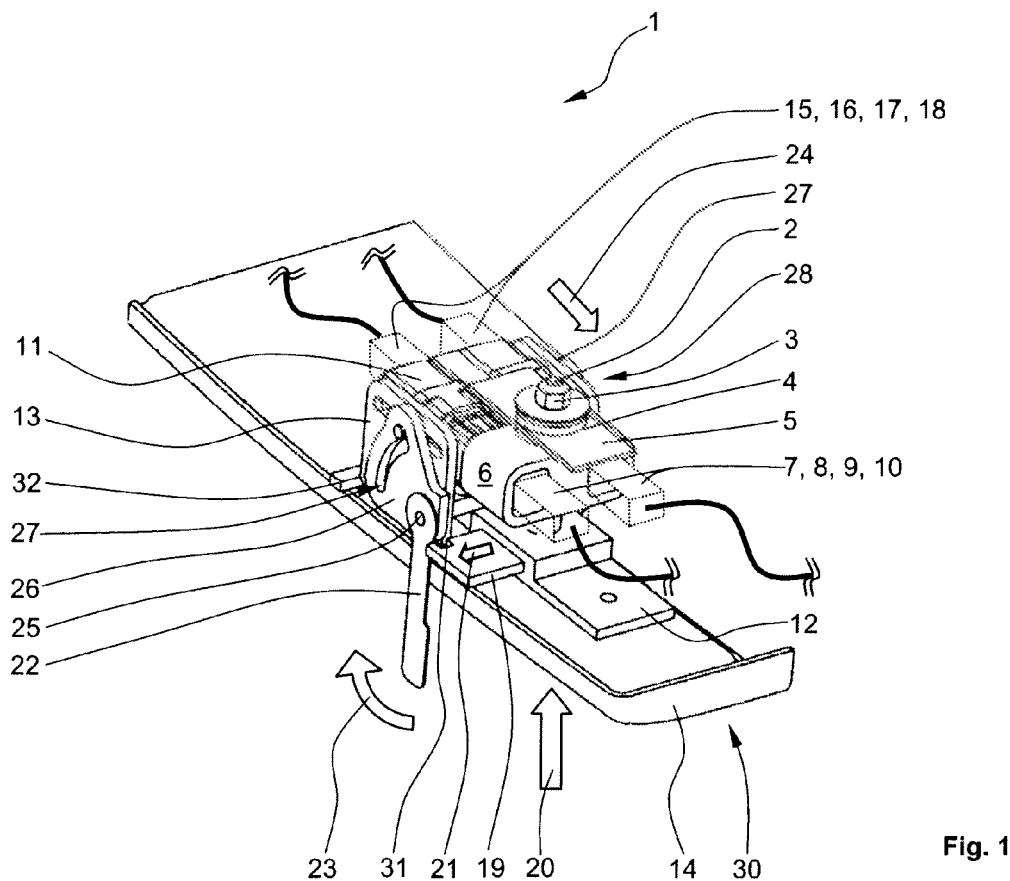
FIG. 1 shows a perspective view of the mounting fixture in the disconnected position.
Figure 2:
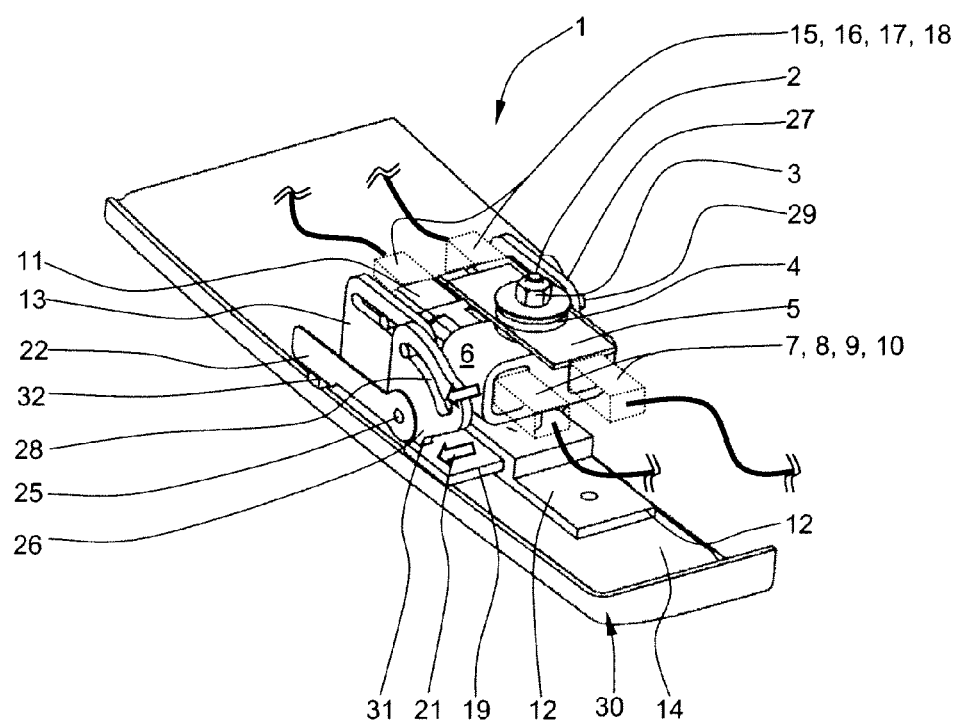
FIG. 2 shows a perspective view of the mounting fixture in the connecting position.

Furthermore reference is first made equally to both FIGS. 1 and 2. FIG. 1 shows a perspective view of the mounting fixture 1 according to the invention in the so-called "separating position" with the cover plate already locked.

The mounting fixture 1 comprises inter alia a fastening pin 2 which is connected to a substructure 5 cushioned against vibration by means of a nut 3 and a rubber buffer 4. A first holder 6 is fixed on the fastening pin 2 in that two connecting elements 9, 10 designed as sockets 7, 8 are fitted with positive locking engagement and preferably with detent locking in at least some areas. A second holder 11 is connected to the (internal) cover plate 14 by means of a retaining bracket 12 and a forked holder 13 fixed thereon. The forked holder 13 can be an integral constituent part of the retaining bracket 12. Two connecting elements 17, 18 designed as plugs 15, 16 are housed in the second holder 11 with detent locking action and positive engagement at least in some areas. The modular form of the mounting fixture 1 with the connecting elements 9, 10, 17, 18 which can be received in the holders 6, 11 has in particular the advantage that the connecting elements 9, 10, 17, 18 are easily exchangeable in the holders 6, 11 whereby a higher design flexibility and easier set-up is provided.

Alternatively the connecting elements 9, 10, 17, 18 can also however be formed as integral constituent parts of the two holders 6, 11. In this design the sockets 7, 8 and plugs 15, 16 can for example be made in simple manner integral with the holders 6, 11 in the injection moulding process. The separate mounting of the connecting elements 9, 10, 17, 18 and the sockets 7, 8 and plugs 15, 16 as "contact carriers" is unnecessary in this variation but easy exchangeability of the plugs 15, 16 and sockets 7, 8 ("female" and "male" contact carriers with pin or bush contacts housed therein) is then no longer provided.

Both the sockets 7, 8 and the plugs 15, 16 can serve for transferring any type of electrical and/or optical signals. Each of the pairs of sockets and plugs 7, 15 and 8, 16 respectively can each connect any number of independent wires (signal channels) to one another. At least one electrical and/or optical cable is attached to the sockets 7, 8 and plugs 15, 16 for cabling. The sockets 7, 8 ("female" contact carriers) and the plugs 15, 16 ("male" contact carriers) respectively are in the event of providing an electrical connection formed with self-locking electrical pin and socket contacts normally used in aircraft construction.

The cables are shown in FIGS. 1, 2 by solid black lines characterised by a thicker line width and for improved clarity are not provided with a reference number.

The sockets 7, 8 and the plugs 15, 16 are aligned in the position shown in FIGS. 1, 2, that is the plugs 15, 16 can after a corresponding linear displacement be inserted or pushed at least partially into the sockets 7, 8. Between the holders 6, 11 there is preferably an elastic seal of slight thickness (not shown) in order on the one hand to prevent moisture from penetrating into the connecting elements 9, 10, 7, 18 and into the holders 6, 11 and on the other hand to provide an elastic pretension between the holders 6, 11, whereby rattling noises are prevented from occurring.

An operating tab 19 is housed with resilient detent action in the retaining bracket 12. The fastening pin 2 is locked with the cover plate 14 by the operating tab 19 and thus the cover plate 14 becomes detachably connected to the substructure 5. The operating tab 19 has a recess (not shown in this drawing) with a detent lug into which a further recess provided at the end of the fastening pin 2 can be introduced with detent action for the where necessary releasable fastening of the cover plate 14 on the substructure 5. By pressing the cover plate 14 up in the direction of the arrow 20 the cover plate 14 is automatically locked in engagement with the substructure 5 and is thereby detachably connected thereto. In order to release the cover plate 14 again from the fastening pin 2 it is necessary to move the operating tab 19 against the action of the spring force by means of a suitable tool, for example a screw driver blade or the like, in the direction of the small arrow 21.

When the cover plate 14 is snap-locked onto the fastening pin 2, by swiveling a contacting lever 22 around roughly 90° in the direction of the curved arrow 23 the second holder 11 is moved linearly in the direction of the arrow 24 by a length of up to 15 mm, which is generally sufficient for sufficient contacting between the connecting elements 9, 10, 17, 18. The plugs 15, 16 are hereby each inserted into the corresponding sockets 7, 8 and the generally electrical and/or the optical contact is produced whereby the mounting fixture 1 according to the invention changes from the so-called "disconnected position" (see FIG. 1) into the so-called "connecting position" (see FIG. 2).

The contacting lever 22 is mounted on a shaft 25 for swivel movement in the forked holder 13 and is connected to two roughly circular segment shaped discs 26, 27. In each of the discs 26, 27 is a circular arc shaped slide 28, 29 in which two pins (not marked by a reference numeral) mounted on the second holder 11 are guided. Through the pins of the second holder 11 guided in the circular arc shaped slides 28, 29 the swivel movement of the contacting lever 22 is transformed into a straight linear movement of the second holder 11 in the direction of the downwardly inclined arrow 24, and vice versa. As can be seen from FIG. 1, the contacting lever 22 in the "disconnected position" protrudes roughly vertical beyond an upper side 30 of the cover plate 14. It is hereby possible to see at one glance whether the cabling beneath the contact plate 14 is properly connected via the plugs 15, 16 and the sockets 7, 8.

The operating tab 19 furthermore has a small rectangular recess 31 which prevents the contacting lever 22 from swiveling in the event that the cover plate 14 is not completely locked onto the fastening pin 2 and the sockets 7, 8 and the plugs 15, 16 are therefore not fully in alignment with one another. In the position shown in FIG. 1, the cover plate is however fully locked and engaged so that the circular segment shaped disc 26 can be swiveled through the recess 31 and free movement of the contacting lever 22 is possible.

Furthermore the retaining bracket 12 has an elastically resilient safety bracket 32. When the contacting lever 22 swivels in the direction of the arrow 23 the safety bracket 32 is overrun by the latter and then springs back automatically behind the contacting lever 22 whereby undesired swivel back of the contacting lever 22 and thus undesired separation of the contact between the sockets 7, 8 and the plugs 15, 16 is prevented.

Figure 3:
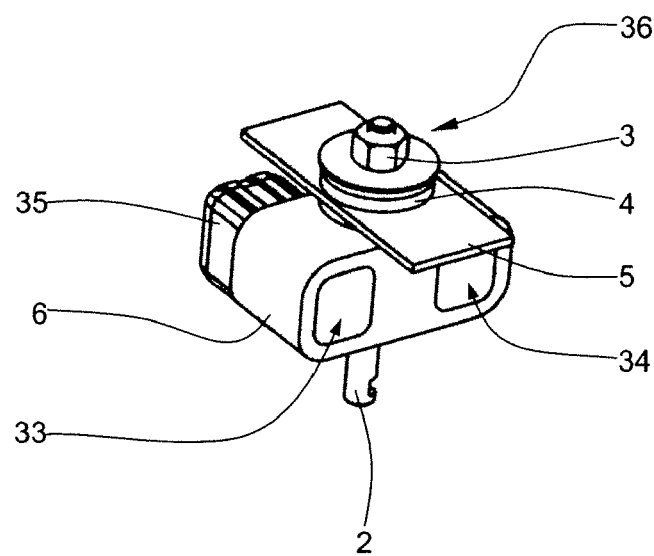
FIG. 3 shows a perspective view of the part of the mounting fixture on the structure side.
Figure 4:
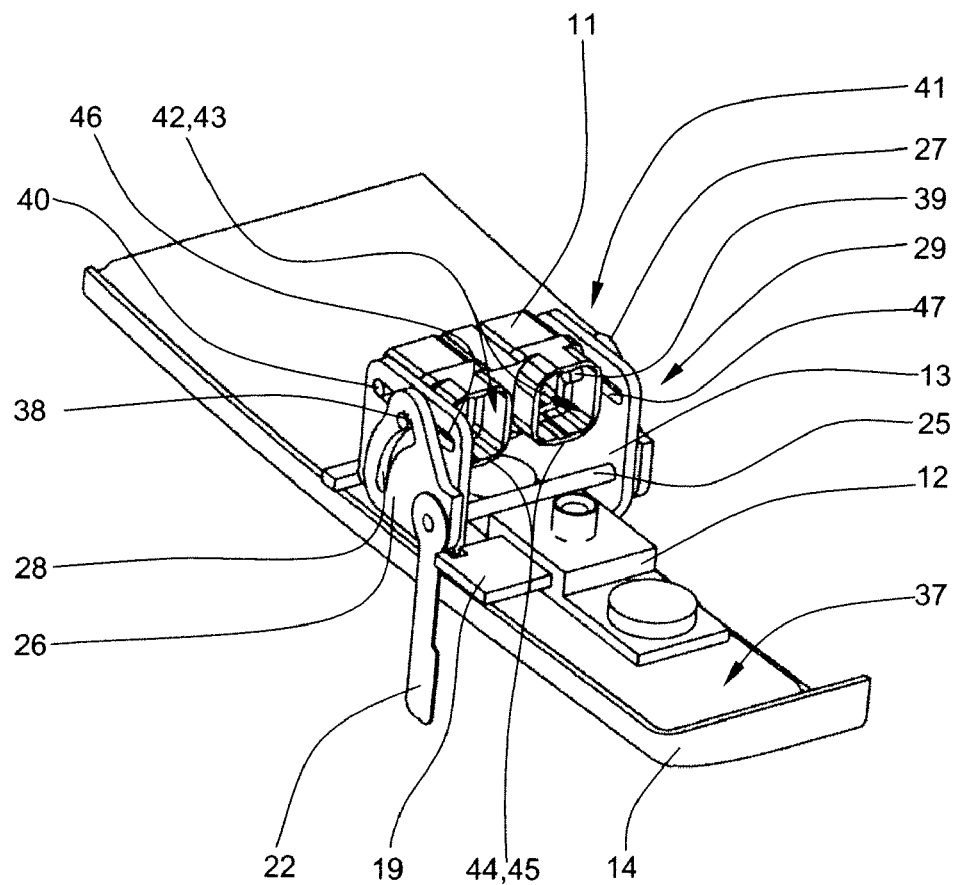
FIG. 4 shows a perspective view of the part of the mounting fixture which is connected to the cover plate.

FIGS. 3 and 4 show the two main components each in a single view. The first holder 6 is fixed on the substructure 5 inside the fuselage cell of an aircraft by means of the nut 3 screwed onto the fastening pin 2 as well as cushioned against vibration by the rubber buffer 4. The first holder 6 has in the illustrated embodiment of FIG. 3 two full-length recesses 33, 34 into which the connecting elements 9, 10 and the sockets 7, 8 are fixedly inserted. The connecting elements 9, 10 are housed with positive locking engagement at least in some areas in the recesses 33, 34 and are additionally locked with the first holder 6 for security.

The two holders 6, 11 inside the mounting fixture 1, differing from the two illustrated connecting elements 9, 10 and 17, 18 respectively, can also each have one, three or an even greater number of connecting elements. The first mounting fixture 6 has two tapered sections 35, 36 on one side.

FIG. 4 shows the second holder 11 of the mounting fixture 1 which is fixed by means of the forked holder 13 on the retaining bracket 12 and thus on an inside face 37 of the cover plate 14. The circular segment shaped discs 26, 27 are housed by means of the contacting lever 22 on the shaft 25 for swivel movement in the forked holder 13. The operating tab 19 serves to lock the retaining bracket 12 on the fastening pin 2 (see FIG. 3). In each of the circular segment shaped discs 26, 27 is a circular arc shaped slide 28, 29 in which the pins 38, 39 which are mounted on the second holder 11 are guided with sliding movement. At least the slides 28, 29 can have at their relevant end points circular shaped expansions on order to achieve a type of snap-fitting effect or a defined end position of the pins in the slides 28, 29 and thus to obtain a tactile transition between the "disconnected position" and the "connecting position" which is sensed by the user during actuation of the contacting lever 22. Furthermore on the second holder 11 there are two further pins 40, 41 which are guided in longitudinal guides 46, 47 in the forked holder 13 in order to prevent the second holder 11 from turning. The longitudinal guides in the two opposite arms of the forked holder 13 run substantially parallel to the cover plate 14.

The (front) pins 38, 39 of the second holder 11 are guided both in the longitudinal guides 46, 47 and also in the circular arc shaped slides 28, 29 whilst the (rear) pins 40, 41 of the second holder 12 slide solely in the longitudinal guides 46, 47. The swivel movement of the contacting lever 22 is converted into a linear movement of the second holder 11 by means of the two circular arc shaped slides 28, 29.

The second holder 11 furthermore has two recesses 42, 43. In the illustrated embodiment the connecting elements 17, 18 (not shown in FIG. 4) and the plugs 15, 16 respectively are housed inside the second holder 11 with positive locking engagement in at least some areas in the recesses 42, 43 and are additionally secured by detent engagement to guard against being removed. The recesses 42, 43 run on one side into two expanded sections 44, 45 wherein the cross-sectional geometry of the two sections 44, 45 is configured so that these can be pushed onto the tapered sections 35, 36 of the first holder 6. In order to guarantee easy insertion and fitting of the second holder 11 into the first holder 6 without damaging the sockets 7, 8 and plugs 15, 16, it is necessary that the holders 6, 11 during the transition from the "disconnected position" into the "connecting position" are aligned as accurately as possible with one another.

All the components of the mounting fixture 1 can be formed with an aluminium alloy material or a thermoplastics and/or duroplastics material, fibre-reinforced where necessary. A mixed use of the said materials is equally possible for manufacturing the mounting fixture 1 and offers inter alia the advantage that with suitable material combinations for example the sliding movements of the pins in the approximately circular arc shaped slides 28, 29, the longitudinal guides 46, 47 as well as the swivel movement of the contacting lever 22 can take place free of lubricant and thus the mounting fixture 1 can be operated with low maintenance throughout its entire service life. For weight reasons a fibre-reinforced, high-tensile, thermoplastics material, more particularly PEEK, is preferably used. Strain relief means and fastening means for the cables can be provided in the region of the holders 6, 11.

Furthermore the holders 6, 11 can be provided with an electrically conducting coating and/or can be formed at least in some areas with an electrically conductive plastics material so that the connecting elements 6, 11 are EMC-protected. For this design also EMC-screened strain relief and fastening means can be used for the connecting cabling (see FIGS. 1, 2 thick bold lines). A complete electromagnetic screening of the holders 6, 11 with the connecting elements 9, 10, 17, 18 housed therein and the sockets and plugs 7, 8, 15, 16 respectively which represent the actual plug connection of the mounting fixture 1, is thereby guaranteed. In a design variation of the mounting fixture 1 of this type neither electromagnetic interference signals can be coupled from outside into the plug connection, nor are such interference signals radiated out to the outside. The coating and the material for the first and second holders 6, 11 as well as the strain relief and fastening means of the cabling can be selected so that they meet the increased lightening protection requirements for aircraft engineering and are in a position to safely divert the high power surges which occur in the event of a lightening strike.

Corresponding to the details above all further components of the mounting fixture 1 can also have an electrically conductive coating or can be formed from an electrically conductive material, more particularly from a plastics material mixed with conductive particles or from an aluminium alloy material.

The invention claimed is:

1. A mounting fixture for detachably fastening a cover plate in an aircraft, more particularly in an airplane, wherein a fastening pin is fixed cushioned against vibration in an area of a substructure and for fastening the cover plate, the fastening pin can be locked with detent action to a retaining bracket mounted on the cover plate, wherein on the fastening pin a first holder with at least one connecting element is mounted and that in the region of the retaining bracket a second holder with at least one further connecting element is provided wherein by swiveling a contacting lever the second holder is linearly displaceable in relation to the first holder, in order in a connecting position of the mounting fixture to introduce the at least one further connecting element at least partially into the at least one connecting element.

2. The mounting fixture according to claim 1 wherein the connecting position of the mounting fixture each at least two opposite connecting elements form in particular an electrical and/or optical connection.

3. The mounting fixture according to claim 1 wherein each at least two opposite connecting elements are each formed as a socket and a plug which in the connecting position are inserted at least partially into one another.

4. The mounting fixture according to claim 1 wherein the contacting lever in a disconnected position in the locked state of the cover plate is visible from outside.

5. The mounting fixture according to claim 1 wherein the region of the retaining bracket there is a security bracket which prevents uncontrolled swiveling of the contacting lever in the connecting position.

6. The mounting fixture according to patent claim 1 wherein the retaining bracket has a resiliently displaceable operating tab which can be snap-locked with the fastening pin.

7. The mounting fixture according to patent claim 6 wherein in the operating tab a recess is provided which enables the contacting lever to swivel only when the cover plate is locked in engagement.

8. The mounting fixture according to claim 1 wherein the second holder is housed linearly displaceable in a forked holder connected to the cover plate.

9. The mounting fixture according to claim 8 wherein the second holder has on each side two pins each which are housed linearly displaceable in the forked holder in two longitudinal guides.

10. The mounting fixture according to claim 8 wherein the conversion of the swivel movement of the contacting lever into a linear displacement of the second holder when changing between the disconnected position and the connecting position takes place with two circular segment shaped discs mounted on a shaft each with a substantially circular arc shaped slide each arranged therein and with pins guided in the slides wherein the shaft is mounted rotatable in the forked holder.

\* \* \* \* \*